April 21, 1959 R. S. ZEBARTH 2,882,550
AUTOMATIC AUGER-TYPE SCALDER SCALDING POULTRY
Filed May 31, 1955 2 Sheets-Sheet 2

INVENTOR.
Ralph S. Zebarth
BY
ATTORNEY.

United States Patent Office 2,882,550
Patented Apr. 21, 1959

2,882,550

AUTOMATIC AUGER-TYPE SCALDER FOR SCALDING POULTRY

Ralph S. Zebarth, Hickman Mills, Mo., assignor to Gordon Johnson Equipment Company, Kansas City, Mo., a corporation of Missouri Application May 31, 1955, Serial No. 512,131

3 Claims. (Cl. 17—11.2)

This invention relates to a method of scalding poultry easily, quickly and efficiently through employment of novel apparatus capable of advancing the poultry through a scalding liquid for a predetermined distance and having means additionally for not only causing the liquid to flow with the poultry, but for tumbling the latter through the liquid until the poultry is removed and drained.

It is the most important object of the present invention to provide a scalding method that contemplates release of the same into the scalding liquid for freedom of movement therethrough, not only along a predetermined path of travel, but in a manner to tumble the birds while the same are within the liquid so as to more thoroughly subject the same to the scalding action of the liquid.

Another object of the instant invention is the provision of the method of scalding poultry which contemplates swirling the birds through a spiral path of travel within a scalding liquid and thereupon immediately and automatically removing the birds from the liquid while simultaneously draining the poultry.

Another important object of the present invention is the provision of novel apparatus for carrying out the steps of the method aforementioned and including an auger within a vat of scalding liquid for continuously advancing the birds from one end of the vat to the opposite end thereof.

A further object of the present invention is to provide apparatus as just above set forth having a liquid circulating system that includes a by-pass interconnecting opposite ends of the vat whereby the auger not only advances the birds, but causes the liquid to flow continuously, such flowing liquid augmenting the action of the auger in advancing the poultry.

A still further object of the instant invention is to provide an automatic auger-type scalder having a lateral trough communicating with the vat at the discharge end thereof for receiving the poultry from the auger, the aforementioned by-pass interconnecting the trough and the forwardmost end of the vat.

Another important object of the present invention is to provide a scalder as above set forth having a foraminous inclined conveyor within the trough for receiving the poultry from the auger, separating the poultry from the liquid whereby the latter flows continuously into the by-pass from the trough and draining the liquid from the poultry as the same is moved to a point of discharge from the trough.

Other objects include the way in which there is provided a novel paddle device at one end of the auger for rotation therewith to direct the poultry into the lateral trough and therefore, onto the discharge conveyor; the way in which the poultry is conveyed to the scalder and automatically discharged into the vat at the aforementioned forwardmost end of the latter; the manner of constructing the auger itself as well as the paddle device whereby the poultry is handled without damage thereto; and many additional more minor objects to be made clear as the following specification progresses.

In the drawings:

Fig. 4 is a cross-sectional view taken on line IV—IV of Fig. 1; and

Fig. 5 is a fragmentary, cross-sectional view taken on line V—V of Fig. 1.

Figure 1:
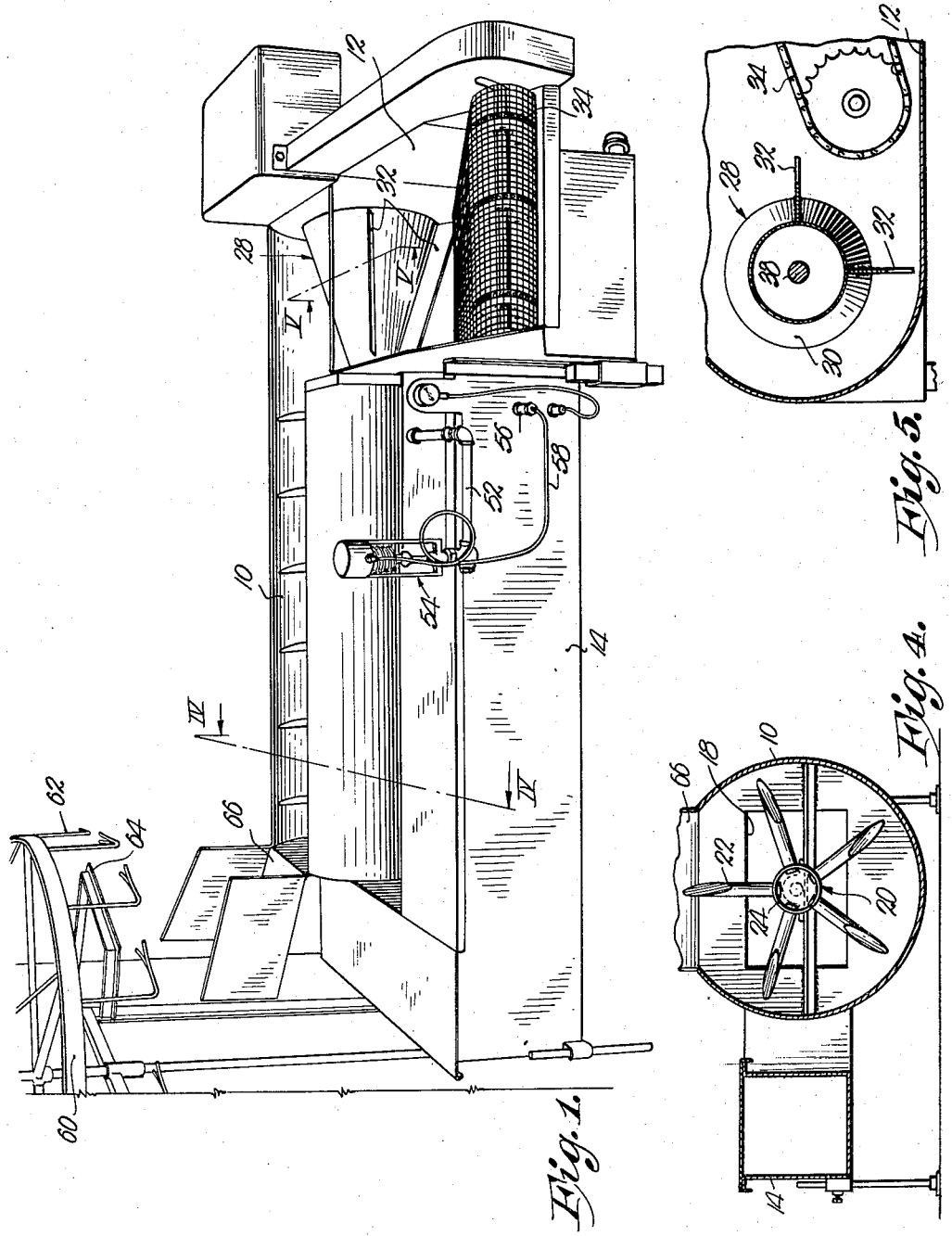
Figure 1 is a top perspective view of an automatic auger-type scalder made pursuant to the present invention showing fragmentarily the means for advancing the poultry to the scalder and discharging the same thereinto.

One form of apparatus for carrying out the method of the instant invention is illustrated in the drawings and includes an elongated vat 10 that is preferably arcuate in transverse cross-section as shown in Fig. 4 and which may be open at its top thereof throughout the entire length thereof if desired.

Figure 3:
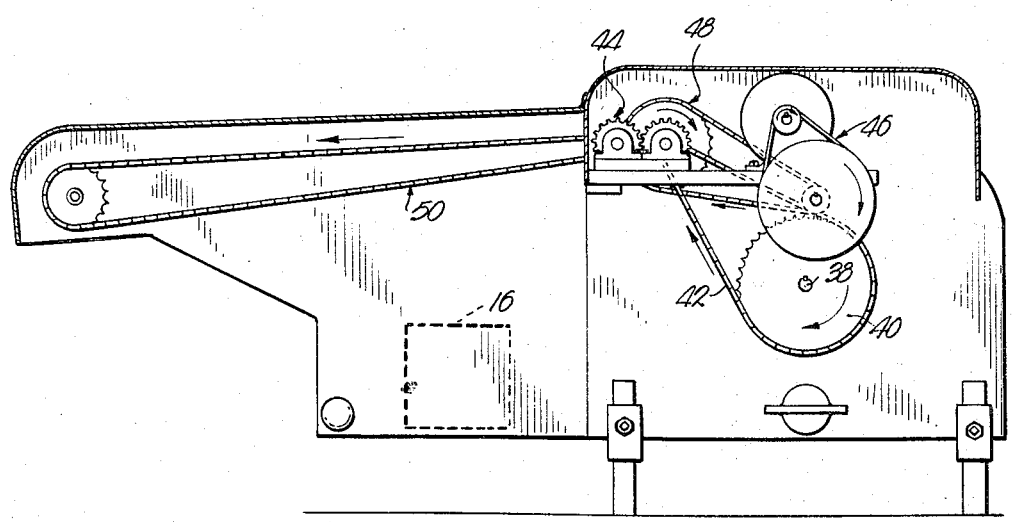
Fig. 3 is an end view thereof, parts being broken away and in section for clearness.

A laterally extending trough 12 communicates with the vat 10 at one end thereof and presents an outlet for vat 10. The opposite end of the vat 10 is connected with the trough 12 through an L-shaped by-pass 14 that is hollow throughout its length as shown in Fig. 4. Trough 12 has an outlet port 16 communicating with the by-pass 14 as seen by dotted lines in Fig. 3 and the forwardmost end of the vat 10 is provided with an inlet port 18, seen in Fig. 4 of the drawings.

Accordingly, a scalding liquid utilized to carry out the method hereinafter more fully set forth, is free to flow continuously in the direction of the arrows shown in Fig. 2. Such continuous movement or circulation of the scalding liquid is caused by rotation of an elongated auger 20 rotatably mounted within the vat 10 and extending longitudinally thereof.

Auger 20 is provided with a plurality of longitudinal rows of elongated, flexible radial fins or fingers 22 secured to its central horizontal tube 24. Fingers 22 are relatively offset and, therefore, disposed in a spiral arrangement, the direction of the spiral being such as to not only move the scalding liquid from the inlet 18 to the opposite end of the vat 10, but to advance and tumble the poultry that is released into the vat 10 and therefore, the scalding liquid.

Such movement of the birds, as well as the liquid, by the fins 22 of auger 20, is augmented by the fact that the outermost ends of the fins 22 are beveled or tapered as at 26, the flat, tapered portions 26 facing generally, the direction of travel of the birds and the liquid, all to the end that the scalding liquid is not only agitated to maintain a uniform temperature, but the birds themselves are handled in a manner to advance the same without interruption and at the same time cause no damage thereto.

In this respect, it is well recognized in this field that a proper scald can only be obtained if the scalding liquid is continuously agitated so as to penetrate through the feathers and is maintained at a correct temperature. The auger 20 is capable of meeting all of such demands and additionally, of tumbling the birds as the same are advanced, oftentimes completely through a spiral path of travel from one end of the vat 10 to the opposite end thereof.

Special means for removing the poultry from the vat 10 and discharging the same into the trough 12, is provided on one end of the auger tube 24 in the nature of a paddle device 28. The rotatable device 28 includes a conical element 30 coaxial with the tube 24 and secured to the proximal end of the tube 24 at the apex end of element 30.

Cone 30 is provided with flexible external paddles 32 extending longitudinally thereof. It is to be preferred that there be provided but one pair of paddles 32 as shown in Fig. 4, and while the same are arranged substantially 90 degrees apart, it is necessary that the distance therebetween be less than 180 degrees to the end that the birds are properly and effectively advanced onto an inclined, foraminous conveyor 34 within the trough 12. It has been found that with the paddles 32 disposed relatively in such manner, the birds are advanced to the lowermost end of the conveyor 34 by one of the paddles 32, whereupon the next succeeding paddle maintains the bird on the conveyor 34 without fall-back into the vat 10 until the bird is definitely being elevated to a point of discharge from the uppermost end of conveyor 34, it being understood that the device 28 rotates anti-clockwise viewing Fig. 5. By virtue of the conical configuration of the device 28, the birds move into the path of travel of the paddles 32 smoothly and successively without bunching, entanglement or jamming and they are, therefore, directed singly to the conveyor 34 without damage thereto.

It is noted that the conveyor 34 extends upwardly and outwardly within the trough 12 from the vat 10 above the outlet port 16 and, therefore, the birds are prevented from flowing into the by-pass 14 and the liquid that drains therefrom through the foraminous conveyor 34 is collected by the trough 12 for flow through the outlet 16.

The auger 20, paddle device 28 and conveyor 34 may all be driven through use of a single prime mover such as an electric motor 36. A shaft 38 through the tube 24 of auger 20 and through the paddle device 28, has a sprocket wheel 40 thereon driven by a continuous chain 42 operably coupled with intermeshing gear means 44. Gear means 44 is in turn driven from prime mover 36 by belt and pulley means 46 and chain and sprocket means 48. Chain and sprocket means 50 operably interconnect the conveyor 34 with the gear means 44.

The scalding liquid within the vat 10, trough 12 and by-pass 14 may be maintained at a predetermined temperature in any suitable manner such as by use of a steam line 52 extending into the by-pass 14 and controlled by a solenoid valve unit 54 interposed in the line 52 and in turn controlled by a thermocouple 56 extending into the liquid in the by-pass 14 and coupled with the unit 54 by a line 58.

The birds may be conveyed to the vat 10 through the medium of an overhead rotatable wheel 60 having a plurality of shackles 62 depending therefrom and from which the birds are suspended. An obstruction 64 extending into the path of travel of the birds, strips the same from the shackles 62 whereupon they drop into a chute 66 and then slide into the vat 10.

Figure 2:
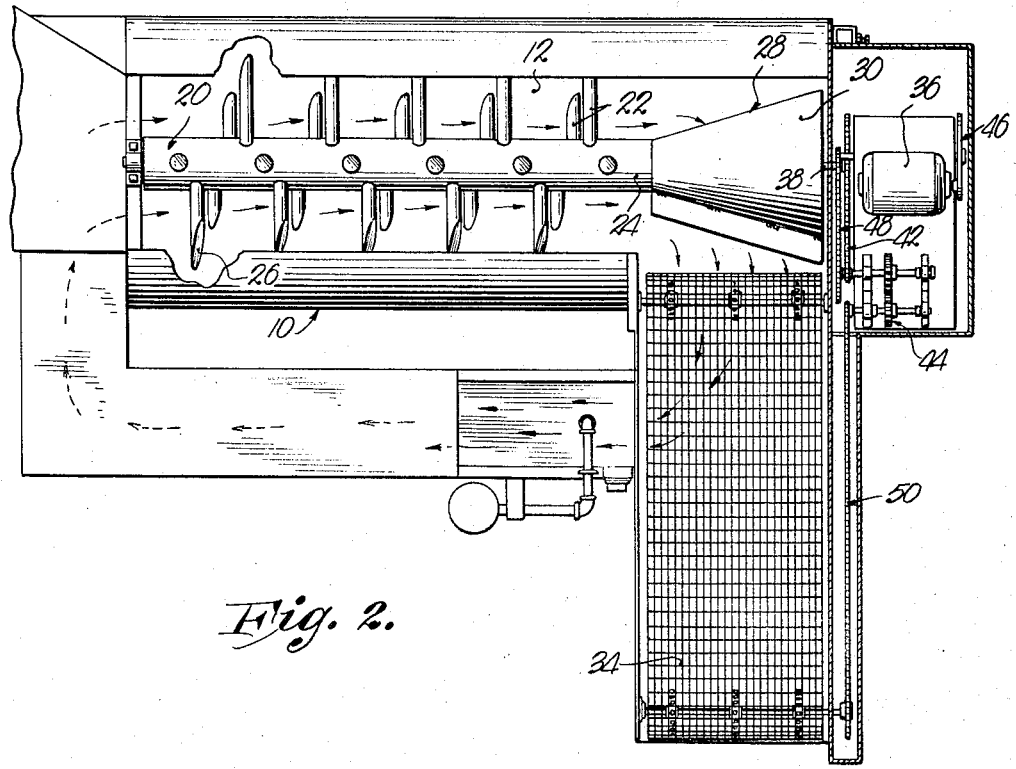
Fig. 2 is a plan view thereof parts being broken away and in section to reveal details of construction.

It is now apparent that the method of the instant invention contemplates releasing the birds from the shackle means 62 into the vat 10 for subjection to the action of the auger 20 and the scalding liquid as the latter moves in the direction of the arrows shown in Fig. 2. The auger 20 not only advances the poultry toward the pick-up means 28, but causes the continuous circulation or flow of the liquid, whereby the latter augments the effect of the auger 20 in causing the birds to be continuously advanced.

Auger 20 not only performs the function of advancing the birds and the scalding liquid simultaneously, but the fins 22 agitate the liquid and thereby maintain a uniform temperature therein throughout the vat 10. As the poultry is advanced, tumbled and agitated through the scalding liquid by the auger 20, the liquid penetrates the feathers, effecting a complete and thorough scalding.

After the birds have been thus conveyed through the scalding liquid for the full length of the vat 10, they are immediately and automatically directed to the atmosphere upon the conveyor 34 where separation between the birds and the liquid takes place, and while the poultry is elevated to a receiving table, poultry picker or the like by the conveyor 34, the liquid is drained therefrom for flow into the trough 12 and thence into the by-pass 14 by way of outlet 16.

Having thus described the invention what is claimed as new and desired to be secured by Letters Patent is:

1. In a poultry scalder, an elongated vat adapted to contain a scalding liquid and having an inlet port at one end thereof; an auger rotatably mounted in the vat for advancing the poultry longitudinally of the vat from said end thereof to the opposite end thereof through the liquid therein; a lateral trough communicating with the vat adjacent said opposite end thereof for receiving the poultry therefrom, said trough having an outlet port; a by-pass interconnecting said ports; and a cone-shaped device coaxial with the auger and having the apex end thereof joined to the auger at said opposite end of the vat for rotation with the auger, said device having external paddles for directing the poultry into the trough.

2. In a poultry scalder, an elongated vat adapted to contain a scalding liquid and having an inlet port at one end thereof; an auger rotatably mounted in the vat for advancing the poultry longitudinally of the vat from said end thereof to the opposite end thereof through the liquid therein; a lateral trough communicating with the vat adjacent said opposite end thereof for receiving the poultry therefrom, said trough having an outlet port; a by-pass interconnecting said ports; a cone-shaped device coaxial with the auger and having the apex end thereof joined to the auger at said opposite end of the vat for rotation with the auger, said device having external paddles for directing the poultry into the trough; and means within the trough for receiving the poultry from said device and directing the same upwardly and outwardly out of the trough.

3. In a poultry scalder, an elongated vat adapted to contain a scalding liquid and having an inlet port at one end thereof; an auger rotatably mounted in the vat for advancing the poultry longitudinally of the vat from said end thereof to the opposite end thereof through the liquid therein; a lateral trough communicating with the vat adjacent said opposite end thereof for receiving the poultry therefrom, said trough having an outlet port; a by-pass interconnecting said ports; a cone-shaped device coaxial with the auger and having the apex end thereof joined to the auger at said opposite end of the vat for rotation with the auger, said device having external paddles for directing the poultry into the trough; and a foraminous conveyor within the trough and extending upwardly and outwardly from said device above the outlet port for receiving the poultry from the device, separating the same from the liquid flowing into the outlet port, and removing the poultry from the trough.

References Cited in the file of this patent

UNITED STATES PATENTS

| | | |
|---|---|---|
| 379,498 | Van Gelder | Mar. 13, 1888 |
| 690,005 | Anderson et al. | Dec. 31, 1901 |
| 1,672,555 | Barker et al. | June 5, 1928 |
| 1,730,964 | Barker et al. | Oct. 8, 1929 |
| 1,732,180 | Brogden | Oct. 15, 1929 |
| 1,932,827 | Morris et al. | Oct. 31, 1933 |
| 2,667,661 | Long | Feb. 2, 1954 |
| 2,727,273 | Long | Dec. 20, 1955 |